(12) United States Patent
Kraft

(10) Patent No.: US 9,839,952 B2
(45) Date of Patent: Dec. 12, 2017

(54) DIE FOR A PUNCHING DEVICE

(71) Applicant: Pass Stanztechnik AG, Creuben (DE)

(72) Inventor: Stefan Kraft, Schnabelwaid (DE)

(73) Assignee: PASS Stanztechnik AG, Creußen (DE)

( * ) Notice: Subject to any disclaimer, the term of this patent is extended or adjusted under 35 U.S.C. 154(b) by 550 days.

(21) Appl. No.: 14/356,672

(22) PCT Filed: Dec. 17, 2012

(86) PCT No.: PCT/EP2012/075764
§ 371 (c)(1),
(2) Date: May 7, 2014

(87) PCT Pub. No.: WO2013/092476
PCT Pub. Date: Jun. 27, 2013

(65) Prior Publication Data
US 2014/0326034 A1 Nov. 6, 2014

(30) Foreign Application Priority Data
Dec. 22, 2011 (DE) .......................... 10 2011 089 682

(51) Int. Cl.
*B21D 28/10* (2006.01)
*B23D 27/00* (2006.01)
(Continued)

(52) U.S. Cl.
CPC ............. *B21D 28/10* (2013.01); *B21D 28/14* (2013.01); *B21D 28/34* (2013.01); *B23D 27/00* (2013.01)

(58) Field of Classification Search
CPC ........ B21D 28/10; B21D 28/14; B21D 28/34; B23D 31/04; B23D 31/02; B23D 31/008;
(Continued)

(56) References Cited

U.S. PATENT DOCUMENTS 2,264,520 A * 12/1941 Gleason ................ B21D 11/10
29/897.3
2,763,228 A * 9/1956 Percy .................... B21D 51/44
72/309
(Continued)

FOREIGN PATENT DOCUMENTS

DE 4235972 A1 * 4/1994 ............. B21D 28/14
DE 10060005 B4 * 3/2007 ............. B21D 22/02
(Continued)

OTHER PUBLICATIONS

PCT/EP2012/075764, international Search Report dated Mar. 7, 2013, 6 pages.
(Continued)

*Primary Examiner* — James S McClellan
*Assistant Examiner* — Peter Iannuzzi
(74) *Attorney, Agent, or Firm* — Boyle Fredrickson S.C.

(57) ABSTRACT

The invention relates to a die for a punching device. The die comprises a die base body and a workpiece support body, which is provided on the die base body, to support a workpiece to be machined as well as a cutting to length mechanism for cutting a workpiece part of the workpiece to length. The cutting to length mechanism has a cutting to length element and a counter-cutting to length element for cutting to length interaction with the cutting to length element by several cutting to length strokes. The cutting to length element and the counter-cutting to length element can be displaced relative to one another between a cutting to length position, in which the cutting to length element and the counter-cutting to length element interact with one another so as to cut to length, and an open position, in which the cutting to length element and the counter-cutting to length element are spaced apart from one another. Further-
(Continued)

more, the die has a guide mechanism to guide the workpiece part.

19 Claims, 14 Drawing Sheets

(51) Int. Cl.
   *B21D 28/14* (2006.01)
   *B21D 28/34* (2006.01)
(58) Field of Classification Search
   CPC ......... B23D 28/34; B23D 27/00–27/06; B23D 25/14; Y10T 83/9418; Y10T 83/9435; Y10T 83/8778; Y10T 83/9411; Y10T 83/9428; Y10T 83/9423; Y10T 83/9442; Y10S 83/916; Y10S 83/917; B26F 1/02; B26F 1/12; B26F 1/14; B26D 3/14
   USPC .... 72/331, 332, 334, 337, 324–328; 83/324, 83/326, 328, 331, 332, 334, 337, 583, 83/682, 692, 689, 679, 684, 686, 916
   See application file for complete search history.

(56) References Cited

U.S. PATENT DOCUMENTS

| | | | |
|---|---|---|---|
| 2,997,907 A * | 8/1961 | Constantino | B21D 28/04 83/140 |
| 5,400,682 A | 3/1995 | Matsuura | |
| 5,988,032 A * | 11/1999 | Seki | B21D 28/34 83/583 |
| 8,261,591 B2 * | 9/2012 | Hielscher | B21D 24/16 72/334 |

FOREIGN PATENT DOCUMENTS

| | | | | |
|---|---|---|---|---|
| EP | 0790085 | | 8/1997 | |
| EP | 1317974 | | 6/2003 | |
| EP | 1317974 A1 | * | 6/2003 | ............ B23D 27/00 |
| EP | 2540428 A1 | * | 1/2013 | ............ B21D 28/16 |
| GB | 2033788 A | * | 5/1980 | ............ B21D 28/10 |
| JP | 6 297053 | | 10/1994 | |
| JP | h09103828 | | 4/1997 | |
| JP | 2000351024 | | 12/2000 | |
| JP | 2003 230920 | | 8/2003 | |
| WO | WO 9204995 A1 | * | 4/1992 | ............ B21D 28/12 |
| WO | WO 2012093523 A1 | * | 7/2012 | ............ B21D 28/02 |

OTHER PUBLICATIONS

DE Appln. No. 10 2011 089 682.1, German Examination Report, dated Sep. 6, 2012, 7 pages.
Office Action dated Aug. 30, 2016 in corresponding JP App. No. 2014-547888.

\* cited by examiner

DIE FOR A PUNCHING DEVICE

CROSS-REFERENCES TO RELATED APPLICATIONS

This application claims the priority of German patent application, Serial No. DE 10 2011 089 682.1, filed Dec. 22, 2011, pursuant to 35 U.S.C. 119(a)-(d), the content of which is incorporated herein by reference in its entirety as if fully set forth herein.

FIELD OF THE APPLICATION

The invention relates to a die for a punching device. Furthermore, the invention is directed to a punching tool for a punching device, which comprises a corresponding die. The invention is also directed to a method for cutting out workpiece parts from workpieces with a corresponding die.

BACKGROUND OF THE INVENTION

Punching devices, the punches and dies of which can progressively score or cut workpieces, are already known from the prior art by public prior use. Workpiece parts bent out of the respective workpiece are cut to length at the end by cutting to length strokes, whereby openings are produced in the workpiece. The cutting to length takes place by means of the die and the punch together. The drawback in these punching devices is that end pieces cut to length from the workpiece part often jam in the die, which can lead to damage or to a stoppage of the whole punching device.

SUMMARY OF THE INVENTION

The invention is therefore based on an object of providing a die for a punching device, which is extremely simply formed and is furthermore extremely functionally reliable. A corresponding punching tool is also to be provided. Furthermore, a corresponding punching method is also to be supplied. Workpieces with protrusion-free edges, in particular sheet metal edges, are also to be producible in an extremely simple manner.

This object is achieved according to the invention by a die for a punching device, comprising:
a) a die base body,
b) a workpiece support body provided on the die base body to support a workpiece to be machined,
c) a cutting to length mechanism for producing a recess in the workpiece by cutting a workpiece part to length, which is fixedly connected to the remaining workpiece by means of a connection end piece during the cutting to length and is bent from the remaining workpiece for the cutting to length into the die, wherein the cutting to length mechanism has
  i) a cutting to length element, and
  ii) a counter-cutting to length element for the cutting to length interaction with the cutting to length element by several cutting to length strokes, wherein the cutting to length element and the counter-cutting to length element can be displaced relative to one another between
    a cutting to length position, in which the cutting to length element and the counter-cutting to length element interact with one another so as to cut to length, and
    an open position, in which the cutting to length element and the counter-cutting to length element are spaced apart from one another, and
d) a guide mechanism for guiding the workpiece part.

The object of the invention is further achieved by a punching tool for a punching device, comprising:
a) a die according to the invention, and
b) a punch for interacting with the die, wherein the punch has
  i) a punch body with a punch mandrel to produce a workpiece part, which is fixedly connected to the remaining workpiece by means of a connection end piece during cutting to length, and to push the latter into the die.

The object of the invention is further achieved by a method for cutting out workpiece parts from workpieces, comprising the steps:
providing a die according to the invention,
producing the workpiece part by at least one cutting stroke of a punch, wherein the workpiece part is fixedly connected to the remaining workpiece by means of a connection end piece during cutting to length and is bent out of the remaining workpiece for the cutting to length into the die,
bringing about a relative movement between the workpiece and the die by means of a feed mechanism to introduce the workpiece part into the cutting to length mechanism, and
actuating the cutting to length mechanism to cut the workpiece part to length, the actuation of the cutting to length part preferably taking place by means of the punch.

The core of the invention is that the die itself has a functional cutting to length mechanism for cutting a workpiece part of the workpiece to length. The workpiece can be cut to length or shortened by the cutting to length mechanism. The relative displacement between the cutting to length element and the counter-cutting to length element can be brought about by a movement of the cutting to length element and/or the counter-cutting to length element. Corresponding known drives can be used for this.

The workpiece part is bent from the actual workpiece for the cutting to length into the die. The workpiece part remains connected to the actual workpiece by a connection end piece of the workpiece part. The connection end piece is taken to mean the end piece of the workpiece part, which is fixedly connected to the actual workpiece during the cutting to length.

The guide mechanism preferably allows a secure guidance of the workpiece part to the cutting to length mechanism and/or a secure discharge of the free workpiece part out of the die.

The relative movement between the workpiece support body and the die base body, in which the workpiece support body and the die base body are movable relative to one another along a stroke axis to carry out the cutting to length strokes, can, for example, be produced by a movement of the workpiece support body and/or the die base body. Advantageously, a movement of the workpiece support body takes place relative to the die base body. Advantageously, the workpiece support body can be actuated by a punch of the punching device.

The cutting to length element is arranged on the die base body. It is preferably formed as a separate component. It is expedient if the cutting to length element is exchangeable. Alternatively, the cutting to length element is formed in one piece with the die base body.

The counter-cutting to length element is arranged on the workpiece support body. It is advantageous if the counter-cutting to length element is formed as a separate component.

The counter-cutting to length element is advantageously exchangeable. Alternatively, the counter-cutting to length element is formed in one piece with the workpiece support body. A reverse arrangement of the cutting to length element and counter-cutting to length element is possible.

The at least one spring element, which moves the cutting to length mechanism into its open position, is arranged between the workpiece support body and the die base body, and is preferably formed as a helical spring. However, it may, for example, also be formed as a plate spring or resilient material block. It is advantageous if the spring element is a compression spring element. The workpiece support body and the die base body can be brought, counter to the spring action of the spring element, into their cutting to length position. A configuration as a tension spring element is alternatively possible with a changed configuration of the die.

The through-opening for the workpiece part is formed in the workpiece support body, the die base body preferably having a first discharge opening aligning with the through-opening to discharge the free workpiece part, and is preferably closed on the peripheral side. It allows a simple guidance of the workpiece part by the workpiece support body or into the die.

It is possible to discharge the free workpiece part or a free connection end piece of the workpiece part without problems and without jamming at the end of the cutting to length process owing to the aligned arrangement of the through-opening and the first discharge opening.

The guide bevel provided by the guide mechanism on the workpiece support body, the guide bevel being provided upstream with respect to the cutting to length mechanism and adjoining the through-opening, allows a particularly reliable guidance of the workpiece part to the cutting to length mechanism. The guide bevel is preferably provided directly on the workpiece support body or on a component that is fixedly connected to the workpiece support body.

The discharge bevel provided by the guide mechanism fixedly connected to the die base body and the cutting to length element having a cutting to length edge, the discharge bevel being provided upstream with respect to the cutting to length edge, allows a particular reliable discharge of the free workpiece part out of the die. It is preferably provided directly on the die base body or on a component fixedly connected to the die base body. The discharge bevel preferably also allows a particularly secure guidance of the workpiece part to the cutting to length mechanism.

The introduction element provided by the guide mechanism on the workpiece support body, with an introduction ramp and the counter-cutting to length element having a counter-cutting to length edge, the introduction ramp being provided upstream with respect to the counter-cutting to length edge, at least one spring element preferably acting on the introduction element, allows an extremely functionally reliable guidance of the workpiece part to the discharge mechanism. The introduction element is preferably provided as a separate component or directly on the workpiece support body. It is advantageous if the introduction ramp aligns with the guide bevel.

As at least one spring element preferably also acts on the introduction element and moves the latter in the direction of the cutting to length element, a displacement of the introduction element by the workpiece part is possible. A particularly functionally reliable guidance of the workpiece part with respect to the cutting to length mechanism is thus possible. It is advantageous, if the spring element is configured as a helical spring. Another configuration, such as, as a plate spring or as a resilient material block, is alternatively possible. It is expedient if the spring element is a compression spring element.

It is advantageous if the introduction element is guided on or in the workpiece support body. The introduction element is preferably prestressed relative to the workpiece support body by at least one prestressing element.

The second discharge opening for discharging cut to length, free end pieces of the workpiece part being provided in the die base body and adjoining the cutting to length mechanism downstream, allows a simple and jamming-free discharge of cut to length, free end pieces of the workpiece part from the die.

The spring body, in which the punch has a base element, includes at least one spring body to apply the cutting force required to cut off an end piece of the workpiece being arranged between the base element and the punch body, the at least one spring body moving the base element and the punch body away from one another, is preferably formed as a helical spring. Alternatively, the latter is configured as a plate spring or resilient material block. The spring body is preferably a compression spring body, which presses the base element and the punch body away from one another or acts on them accordingly.

The trapezoidal form of the punch mandrel, in which the punch has a cross-sectionally trapezoidal punch mandrel, the punch mandrel preferably being wider at the front than at the rear in a feed direction of a workpiece, allows particularly good and exact production of inner cutouts or inner recesses on the workpiece. The punch mandrel has a front cutting edge and a rear edge, which runs parallel to the cutting edge. The cutting edge is arranged in front of the rear edge in a feed direction of a workpiece. Oblique edges run between the cutting edge and the rear edge. The cutting edge is longer than the rear edge. The oblique edges thus run toward one another from the cutting edge to the rear edge.

It is advantageous if at least one rearwardly projecting, free back-guide, which is advantageously pin-like and, for example, cross-sectionally rectangular, is furthermore arranged on the punch or on the punch mandrel thereof. Transverse forces on the tool can easily be absorbed by the back-guide. The tool can thus not move away laterally. It is then virtually fixed.

The spring body, in which (a) at least one spring element, which moves the cutting to length mechanism into its open position, is arranged between the workpiece support body and the die base body of the die, and (b) at least one spring body to apply a cutting force necessary to cut off an end piece of a workpiece is arranged between a base element of the punch and a punch body of the punch, the at least one spring body moving the base element and the punch body away from one another, is preferably formed as a helical spring. Alternatively, it is formed as a plate spring or a resilient material block. The spring body is preferably a compression spring body, which presses the base element and the punch body away from one another or acts on them accordingly.

Two preferred embodiments of the invention will be described by way of example below with reference to the accompanying drawings

DESCRIPTION OF THE PREFERRED EMBODIMENTS

Figure 1:
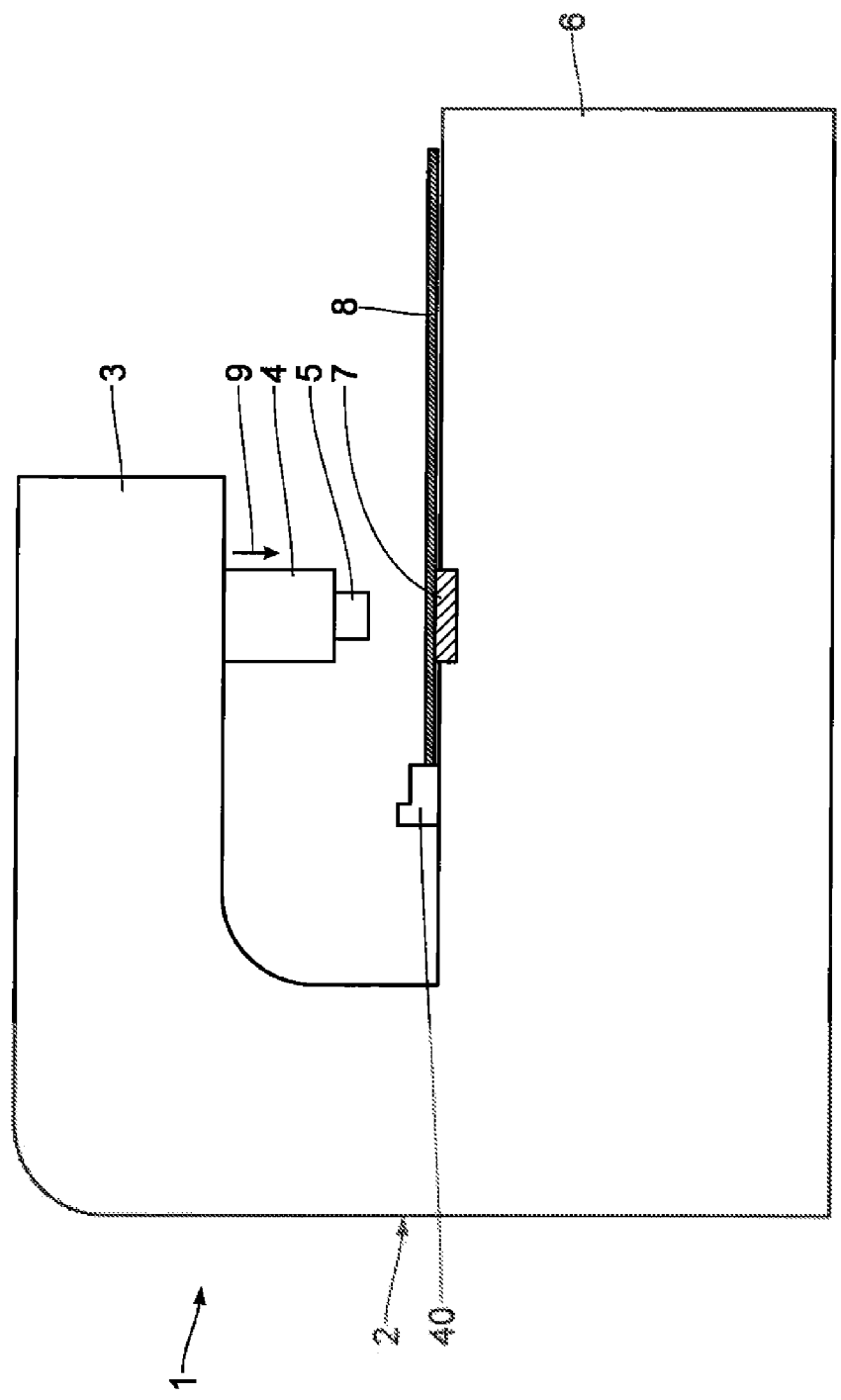
FIG. 1 shows a schematic view of a punching device with a punching tool according to the invention.

A punching device 1 shown in its entirety in FIG. 1 comprises a frame 2, an actuating plunger 4 being attached to the upper frame part 3 thereof. A punch 5 is arranged under the actuating plunger 4. A die 7 is located on the lower frame part 6 of the frame 2. The punch 5 and the die 7 together form a punching tool.

A workpiece 8 to be machined, which is a metal sheet here, is located between the punch 5 and the die 7. The punch 5 is movable in a punching direction 9 in the direction of the die 7 or the workpiece 8. According to FIG. 1, the punching direction 9 is directed vertically downward.

A first embodiment of the punching tool will be described below with reference to FIGS. 2 to 13.

The punch 5 comprises a base plate 10 and a punch body 11. The base plate 10 has a contact face 18, which faces the workpiece 8 and extends perpendicular to the punching direction 9. A punch mandrel opening 12, which is preferably closed peripherally, is formed in the base plate 10.

A punch mandrel 13 projects from the punch body 11 in the direction of the workpiece 8 or the die 7 in the punching direction 9. The punch mandrel 13 is preferably rectangular in cross-section and has a punch face 46, which faces the die 7 and runs obliquely with respect to the workpiece 8. The punch mandrel opening 12 is adapted to the cross-section of the punch mandrel 13. The base plate 10 preferably also forms a stripper for the punch mandrel 13.

Arranged between the punch body 11 and the base plate 10 are a plurality of compressible, first helical compression springs 14, which press the punch body 11 and the base plate 10 away from one another when the base plate 10 is free. The helical compression springs 14 form spring bodies.

The die 7 in turn comprises a die base body 15 and a workpiece support body 16, which has a level support face 17 to support the workpiece 8. The support face 17 extends parallel to the contact face 18.

The die base body 15 has a first discharge opening 19 passing through it, which is arranged aligned with the punch mandrel opening 12. It is advantageous if the cross-section of the first discharge opening 19 substantially corresponds to the cross-section of the punch mandrel opening 12.

A second discharge opening 20, which extends laterally next to the first discharge opening 19 and parallel thereto, is furthermore formed in the die base body 15.

A partition wall 21, which separates the discharge openings 19, 20 from one another, extends between the first discharge opening 19 and the second discharge opening 20. The partition wall 21 is a component of the die base body 15 and, compared to the actual die base body 15, has a reduced height.

A cutting to length element 22, which has a discharge bevel 23 facing the first discharge opening 19 or the punch mandrel opening 12, is seated on the partition wall 21. Downstream of the discharge bevel 23, the cutting to length element 22 has a free cutting to length edge 24, which is preferably formed by a right angle on the cutting to length element 22. The cutting to length element 22 furthermore has a base side 25, which opposes the discharge bevel 23 and adjoins the partition wall 21. The free side 26 extending between the cutting to length edge 24 and the base side 25 delimits the second discharge opening 20 toward the first discharge opening 19. The free side 26 extends perpendicular to the base side 25. The cutting to length element 22 is cross-sectionally substantially a right triangle body.

The workpiece support body 16 has a through-opening 27, which proceeds from the support face 17. The through-opening 27 substantially aligns with the punch mandrel opening 12 and the first discharge opening 19. A guide bevel 28, which is substantially provided opposing the discharge bevel 23, adjoins the through-opening 27.

A counter-cutting to length element 30, which is cross-sectionally preferably right parallelepiped, is arranged on the workpiece support body 16 on its lower side 29 remote from the support face 17. The counter-cutting to length element 30 preferably at least partly delimits the second discharge opening 20 upwardly. The counter-cutting to length element 30 has a free counter-cutting to length edge 31, which is formed to interact with the cutting to length edge 24 of the cutting to length element 22 and is arranged accordingly. The counter-cutting to length edge 31 is formed by a side face 32 running away from the lower side 29 and a head face 33 of the counter-cutting to length element 30 adjoining the latter, said head face delimiting the second discharge opening 20 toward the workpiece support body 16 or running parallel to the support face 17.

The counter-cutting to length element 30 and the cutting to length element 22 are arranged in such a way that the side face 32 and the free side 26 are slightly offset with respect to one another. The side face 32 and the free side 26 preferably run substantially parallel to one another. The cutting to length element 22 and the counter-cutting to length element 30 together form a cutting to length mechanism. The cutting to length mechanism is arranged in its entirety adjacent to precisely one side of the workpiece 8.

Arranged between the counter-cutting to length element 30 and the guide bevel 28 is, advantageously, an introduction element 34. The introduction element 34 is mounted directly on the workpiece support body 16 or indirectly on the workpiece support body 16 opposing the cutting to length element 22. It has an oblique introduction ramp 35, which extends the guide bevel 28 substantially in the direction of the counter-cutting to length element 30 and ends at the counter-cutting to length edge 31. The introduction element 34 is formed in cross-section as a right triangle, the introduction ramp 35 facing the cutting to length element 22.

The discharge bevel 23, the introduction ramp 35 and the guide bevel 28 together form a guide mechanism with a guide funnel tapering in the direction of the second discharge opening 20 or the cutting to length mechanism.

Arranged between the die base body 15 and the workpiece support body 16 are a plurality of compressible, second helical compression springs 36, which press the workpiece support body 16 away from the die base body 15 or press it in the direction of the punch 5. The helical compression springs 36 form spring elements.

The starting spring force of the helical compression springs 14 is greater than the maximum spring force of the helical compression springs 36. The starting spring force of the helical compression springs 14 is greater than the punching force required to punch a workpiece part 38 of the workpiece 8 in the cutting to length mechanism. The starting spring force of the helical compression springs 36 is greater than the weight force of the workpiece 8.

The punching tool during punching use will be described in more detail below. A start is made, in this case, from FIG. 2, which shows a rest position of the punching tool.

Figure 2:
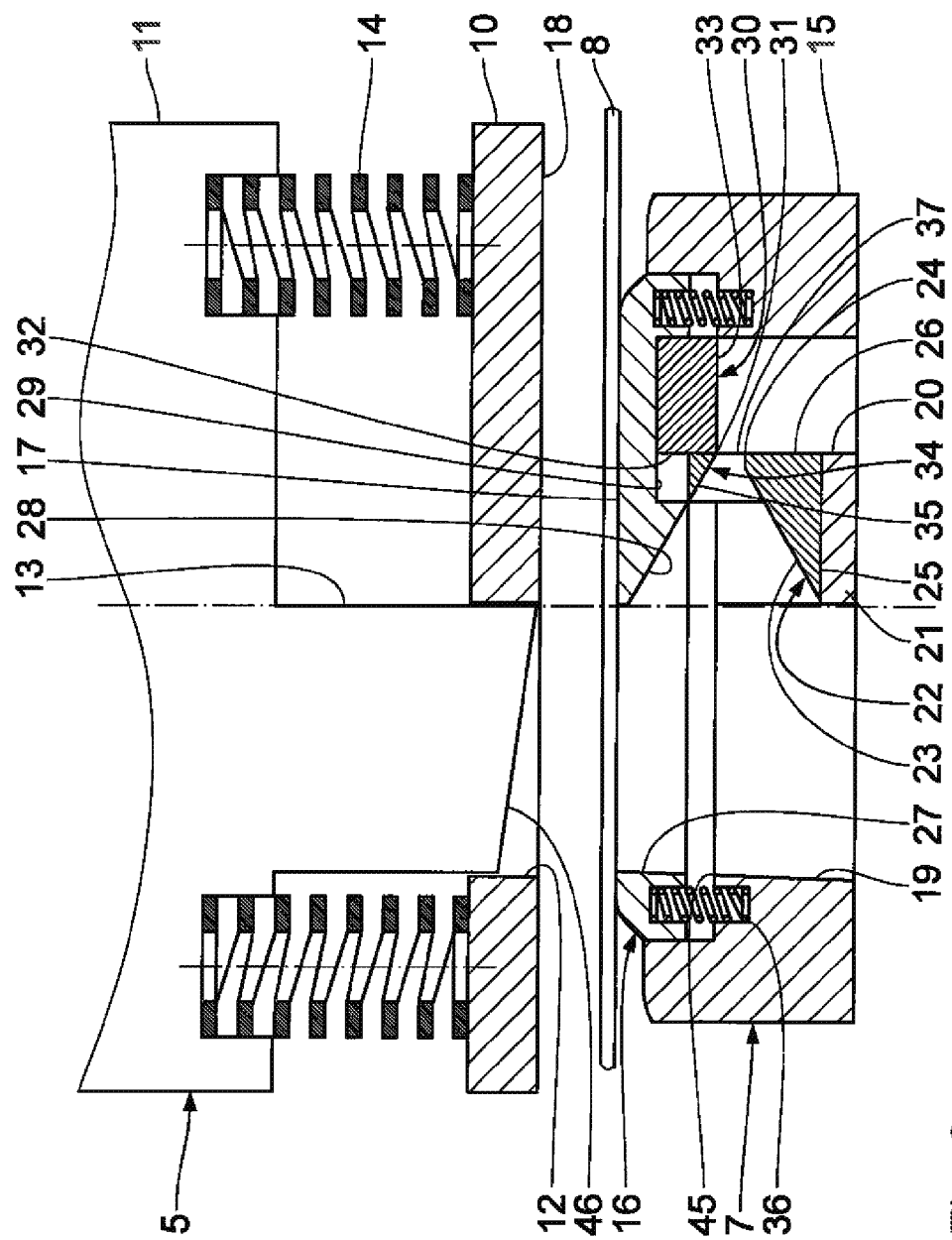
FIG. 2 shows a schematic sectional view of the punching tool shown in FIG. 1, which is in its rest position.

According to FIG. 2, the workpiece 8 to be machined rests flat on the support face 17 of the workpiece support body 16. The contact face 18 is spaced apart from the workpiece 8 counter to the punching direction 9.

The cutting to length mechanism is in its open position. The cutting to length element 22 and the counter-cutting to length element 30 are thus arranged spaced apart from one another. The free side 26 and the side face 32 substantially align with one another. A cutting to length gap 37, which produces a through-connection between the second discharge opening 20 and the guide funnel or the first discharge opening 19, is present between the cutting to length edge 24 and the counter-cutting to length edge 31. The cutting to length gap 37 has a height, which is greater than the thickness of the workpiece 8 to be machined. To form the cutting to length gap 37, the workpiece support body 16 is located in its upper position; it is thus arranged spaced apart from a stop face 45 of the die base body 15 facing the workpiece support body 16, said stop face running perpendicular to the punching direction 9. This is achieved by the helical compression springs 36.

The punch body 11 is located in its upper rest position, in which it has a maximum spacing in the punching direction 9 from the base plate 10.

Figure 3:
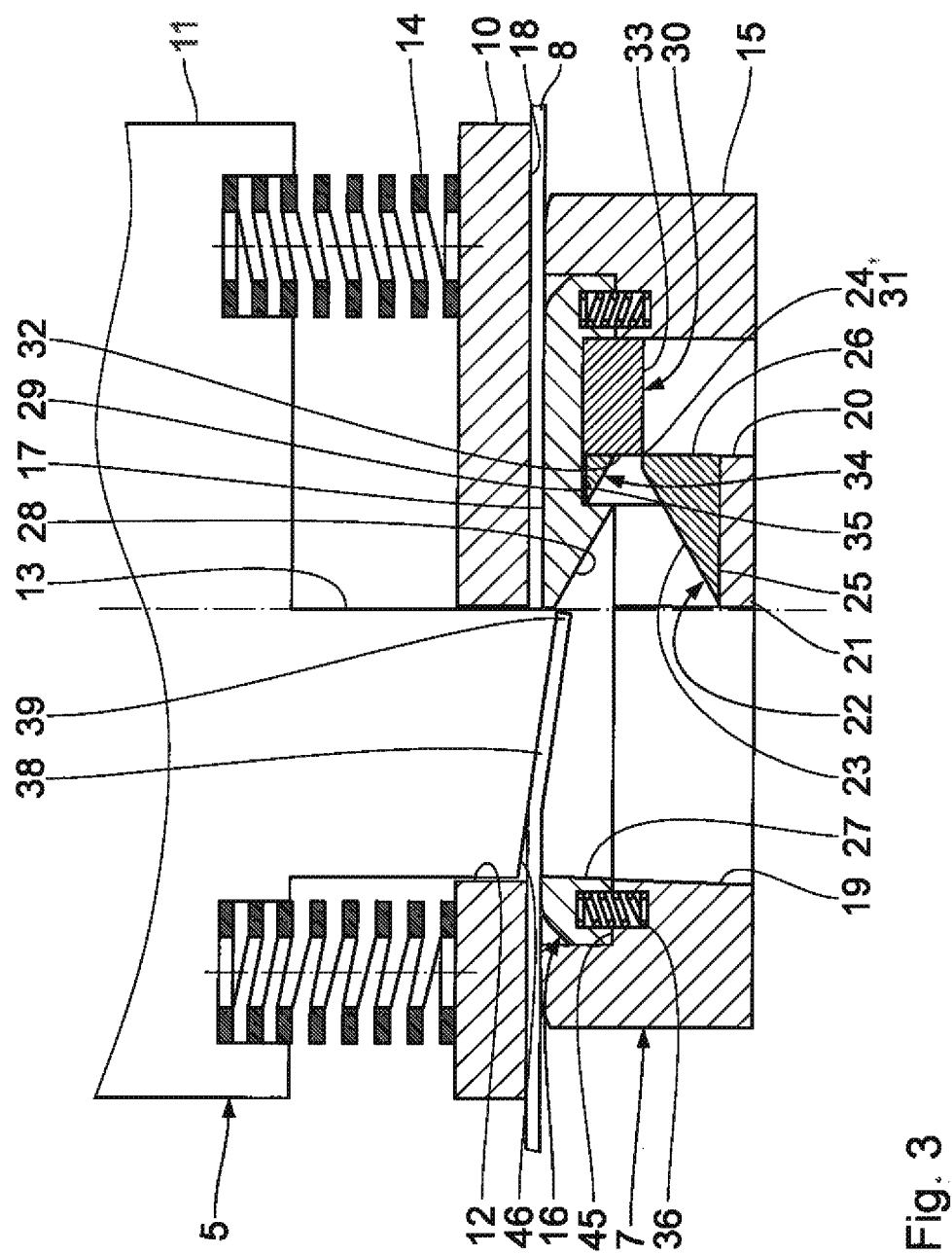
FIG. 3 shows a schematic sectional view of the punching tool, which is in a first cutting position

The punching tool is then transferred into its first cutting position, which is shown in FIG. 3. To reach the first cutting position, a compressive force directed onto the workpiece 8 or in the punching direction 9 is exerted on the punch body 11 by the actuating plunger 4, so the punch body 11 approaches the base plate 10. In this case, the helical compression springs 14 are compressed and the punch mandrel 13 at least partly passes through the punch mandrel opening 12. The punch mandrel 13 partly passes through the workpiece 8 and projects into the through-opening 27. The punch body 11 is located in its lower cutting position.

As already mentioned, the punch face 46 runs obliquely. The punch mandrel 13 has a greater length on the side region facing the cutting to length mechanism than on the side region remote from the cutting to length mechanism. It passes with the. side region facing the cutting to length mechanism into the workpiece 8, while the other side region of the punch mandrel 13 does not pass into the workpiece 8 or remains spaced apart from the workpiece 8.

Owing to the oblique course of the punch face 46 and the described actuating of the punch 5, the workpiece part 38 is cut out of the workpiece 8 in such a way that it remains fixedly connected to the remaining workpiece 8 by means of a connection end piece. The connection of the workpiece part 38 to the remaining workpiece 8, or the connection end piece, opposes the cutting to length mechanism in the workpiece 8. The workpiece part 38 is substantially rectangular according to this embodiment, it having been cut free out of the remaining workpiece 8 on three connected sides. It has an end piece 39, which opposes the connection end piece and faces the cutting to length mechanism. The punching tool has carried out a cutting stroke, the punch mandrel 13 having been axially offset.

The workpiece part 38 is further bent into the through-opening 27 by the punch mandrel 13.

The cutting to length mechanism is in its cutting to length position, this not having any influence on the workpiece part 38. The workpiece part 38 is namely spaced apart from the cutting to length mechanism. In the cutting to length position, the cutting to length gap 37 is closed.

The base plate 10 then rests on the workpiece 8 opposing the die 7.

The workpiece support body 16 has approached the actual die base body 15. It rests on the stop face 45. The workpiece support body 16 is guided by the die base body 15.

Figure 4:
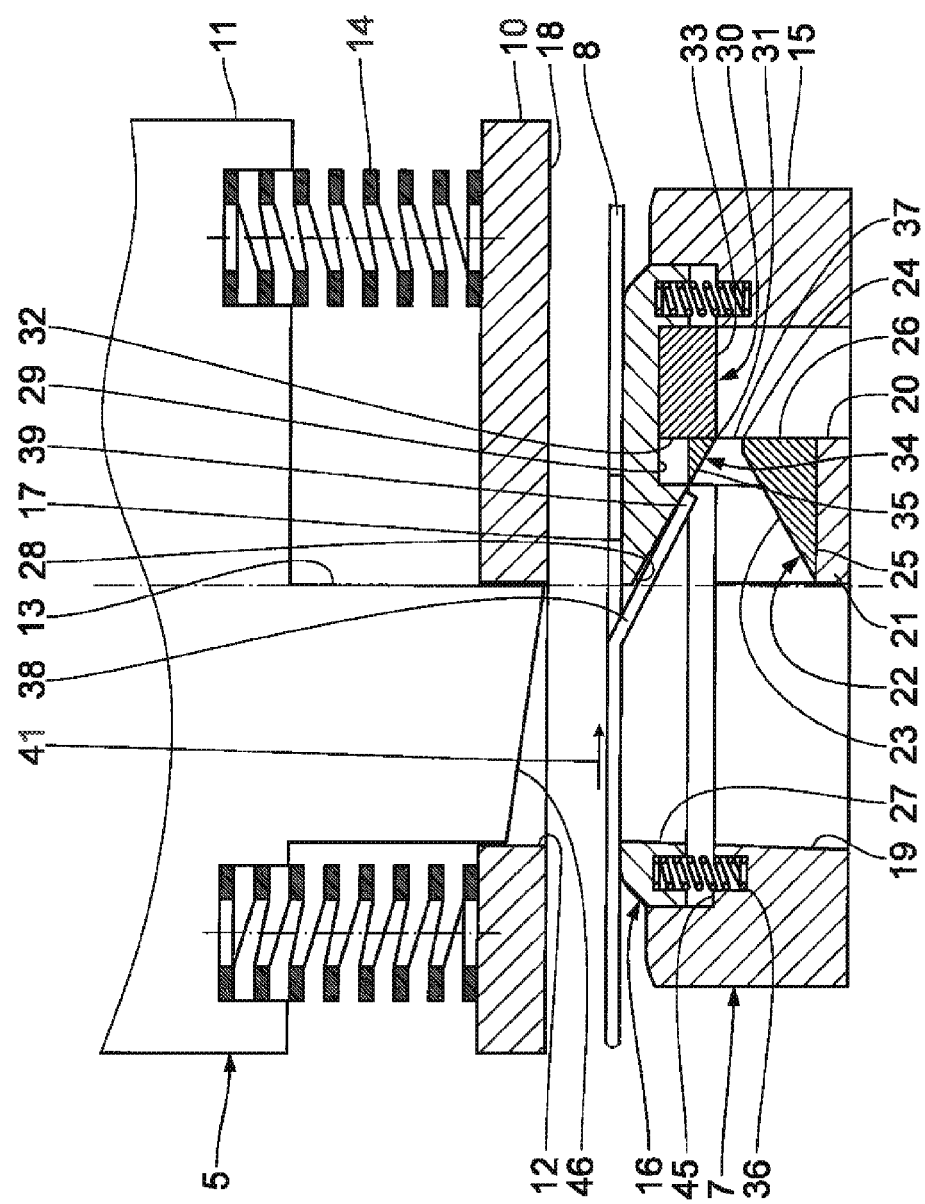
FIG. 4 shows a schematic sectional view of the punching tool, which shows the workpiece in a position moved toward the cutting to length mechanism.

Referring to FIG. 4, the punch body 11 with its punch mandrel 13 is again in its upper rest position. It has been moved counter to the punching direction 9. The base plate 10 is spaced apart from the workpiece 8 again here.

The workpiece support body 16 is located in its upper position. It has been pressed upwardly by the helical compression springs 36.

The workpiece 8 has been displaced by a feed mechanism 40 (FIG. 1) in a feed direction 41 onto the cutting to length mechanism in such a way that the end piece 39 has also been displaced over the guide bevel 28 in the direction of the cutting to length mechanism. The workpiece part 38 in this case slides on the guide bevel 28. The end piece 39 is located spaced apart from the cutting to length gap 37.

Figure 5:
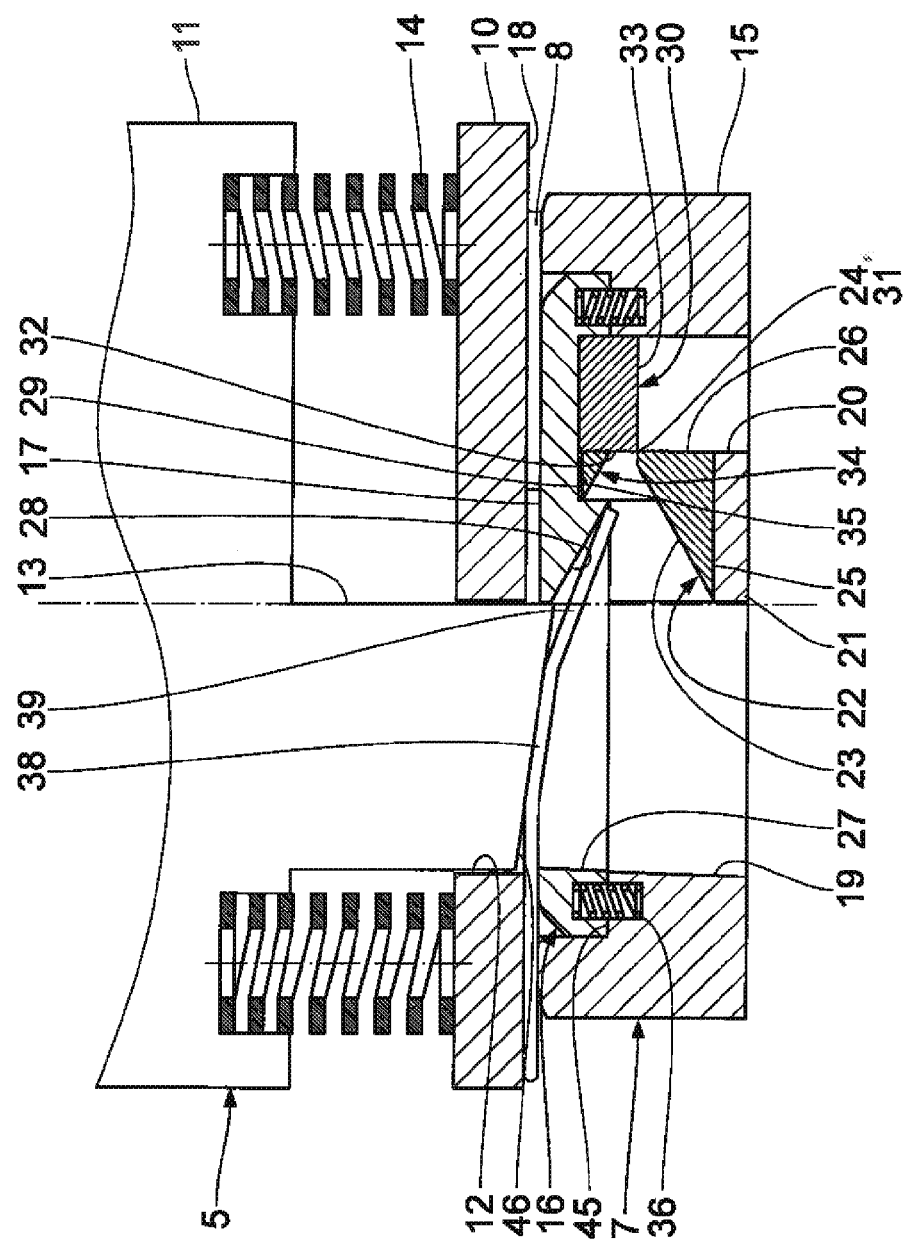
FIG. 5 shows a schematic sectional view of the punching tool, in which the punching tool is in a second cutting position.

FIG. 5 shows the second cutting position of the punching tool, which substantially resembles the first cutting position.

The punch mandrel 13 continues the cutting of the workpiece 8 in accordance with the first cutting position, so the workpiece part 38 is substantially lengthened. The connection between the workpiece part 38 and the actual workpiece 8 is virtually displaced. The cutting to length mechanism is further virtually without function.

Figure 6:
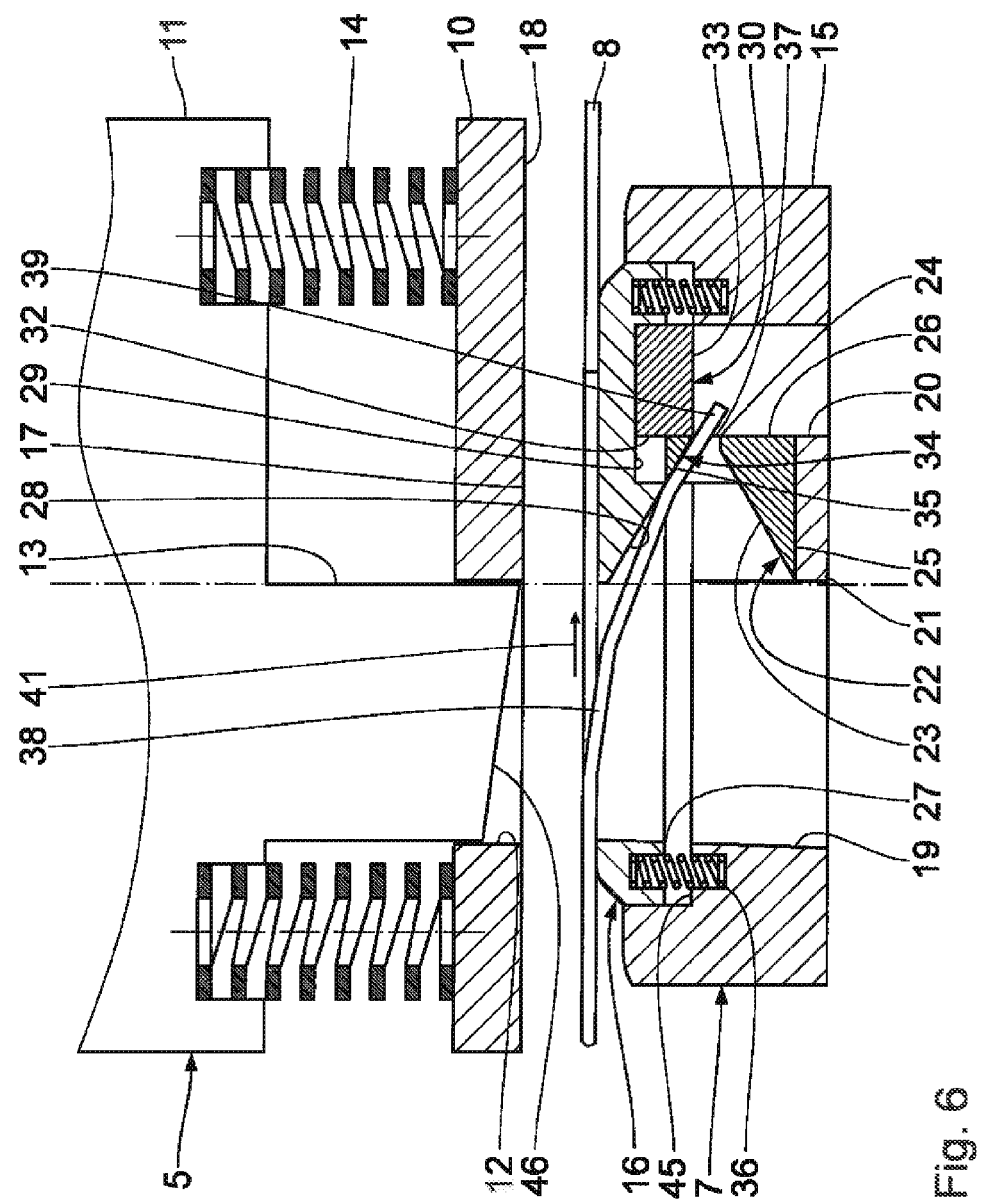
FIG. 6 shows a schematic sectional view of the punching tool, in which the workpiece is shown moved further in the direction of the cutting to length mechanism and projects into the open cutting to length mechanism.

Referring to FIG. 6, the punch body 11 with its punch mandrel 13 is again located in its upper rest position.

The workpiece 8 has been further displaced in the feed direction 41 by the feed mechanism 40. In the process, it slid along the introduction ramp 35. The end piece 39 passes through the cutting to length gap 37 and is located in the second discharge opening 20 or in the open cutting to length mechanism.

Figure 7:
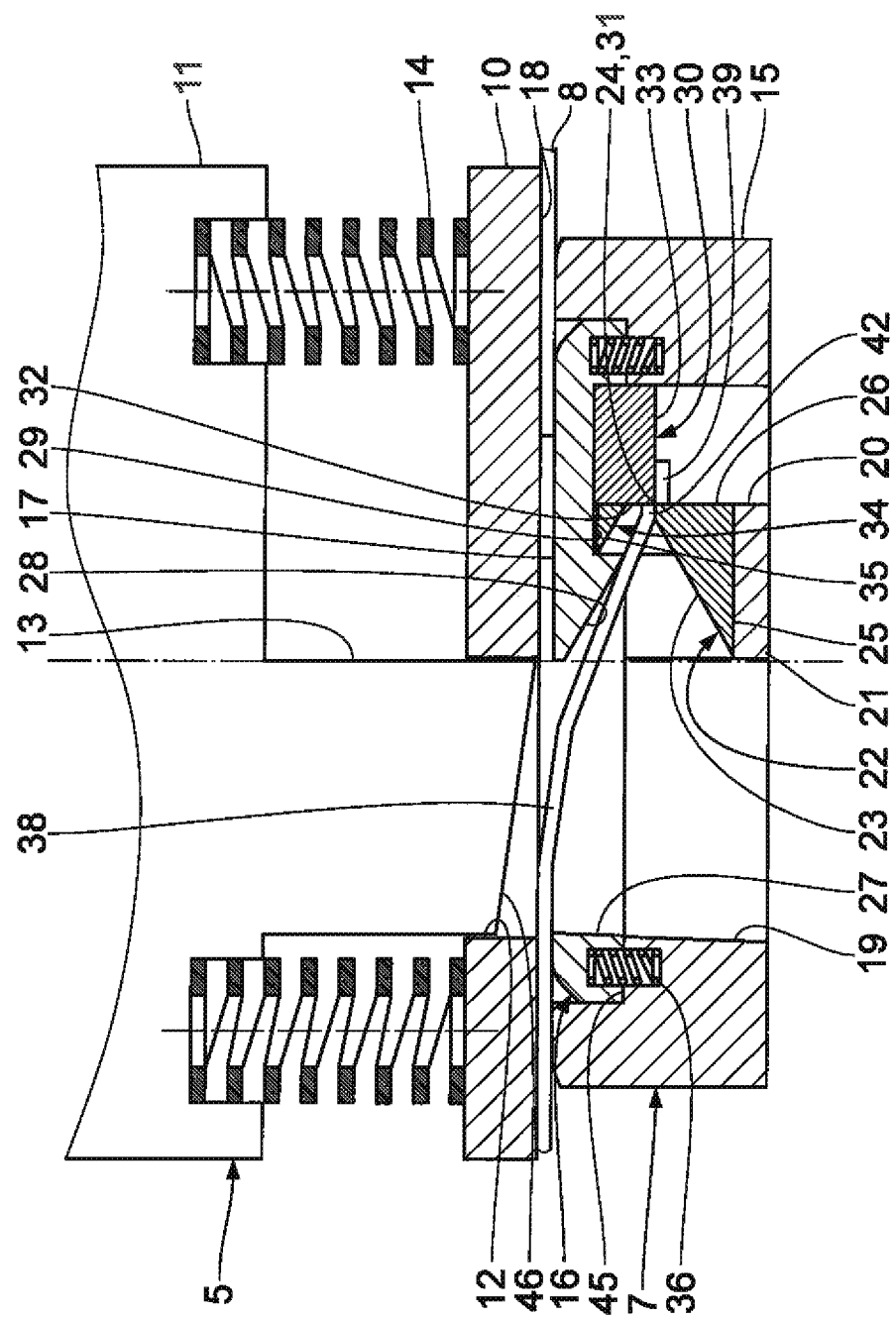
FIG. 7 shows a schematic sectional view of the punching tool, which shows a first cutting to length stroke of the punching tool.

Referring to FIG. 7, the punching tool carries out a first cutting to length stroke, in which the punch body 11 is moved in the direction of the base plate 10. The cutting to length stroke is smaller than the cutting strokes, so the punch mandrel remains spaced apart from the workpiece 8 or the workpiece part 38.

The workpiece support body 16 has been displaced in the direction of the die base body 15. It rests on the stop face 45. The helical compression springs 14 transmit the cutting force onto the cutting to length mechanism, until the workpiece support body 16 rests on the stop face 45.

The cutting to length edge 24 and the counter-cutting to length edge 31 work together so as to cut to length, so that the end piece 39 projecting into the second discharge opening 20 is severed or cut off. The cutting to length mechanism is in its cutting to length position. The cutting to length gap 37 is closed. The workpiece part 38 now has a new end piece 42.

Figure 8:
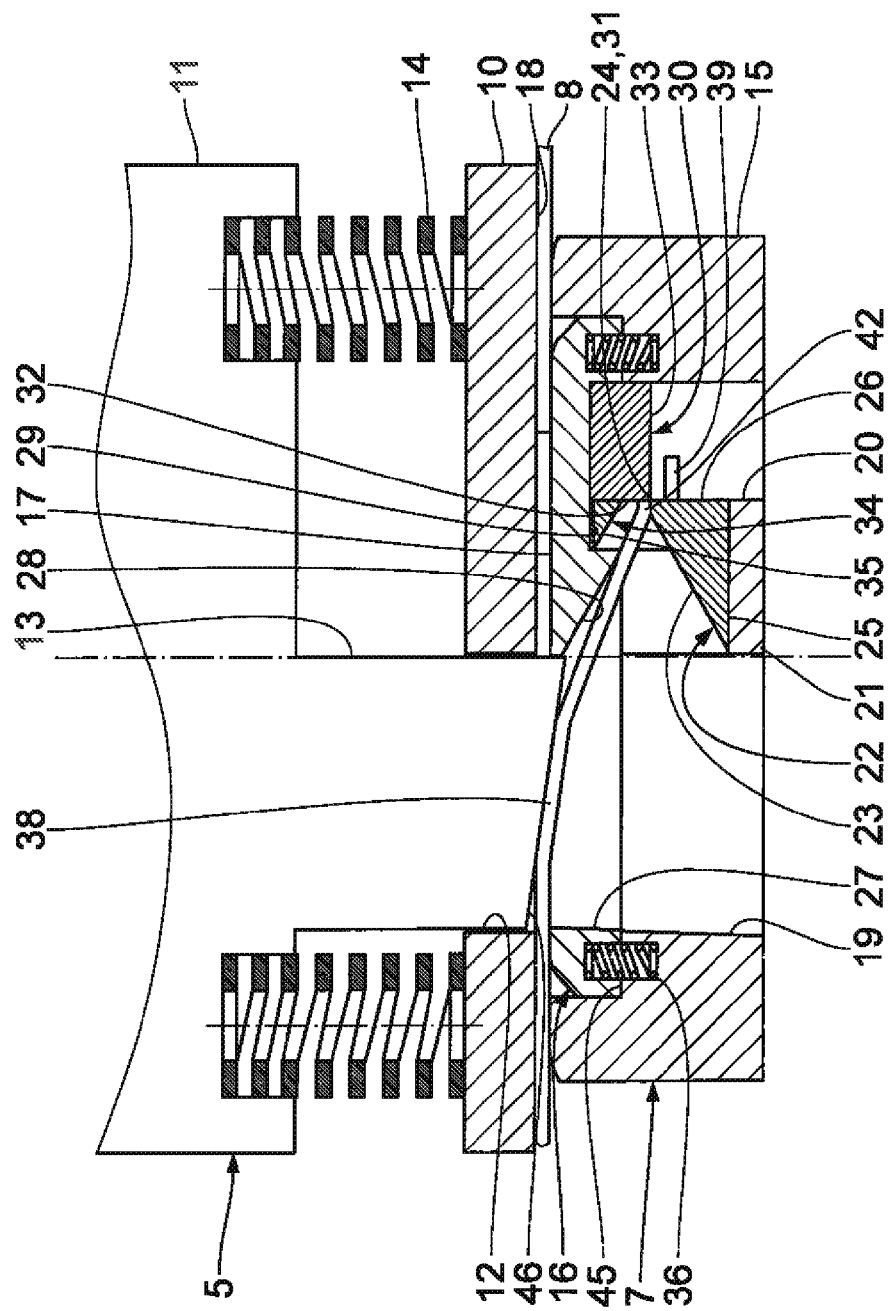
FIG. 8 shows a schematic sectional view of the punching tool, which shows the punching tool in a third cutting position.

The punching tool is located in its third cutting position in FIG. 8, which substantially corresponds to the first and second cutting position.

The workpiece part 38 is furthermore cut free laterally. The free end piece 39 is discharged by way of the second discharge opening 20. Compared to FIG. 7, the helical springs 14 have been further compressed here, as the base plate 10 presses on the die base body 15 by way of the workpiece 8.

Figure 9:
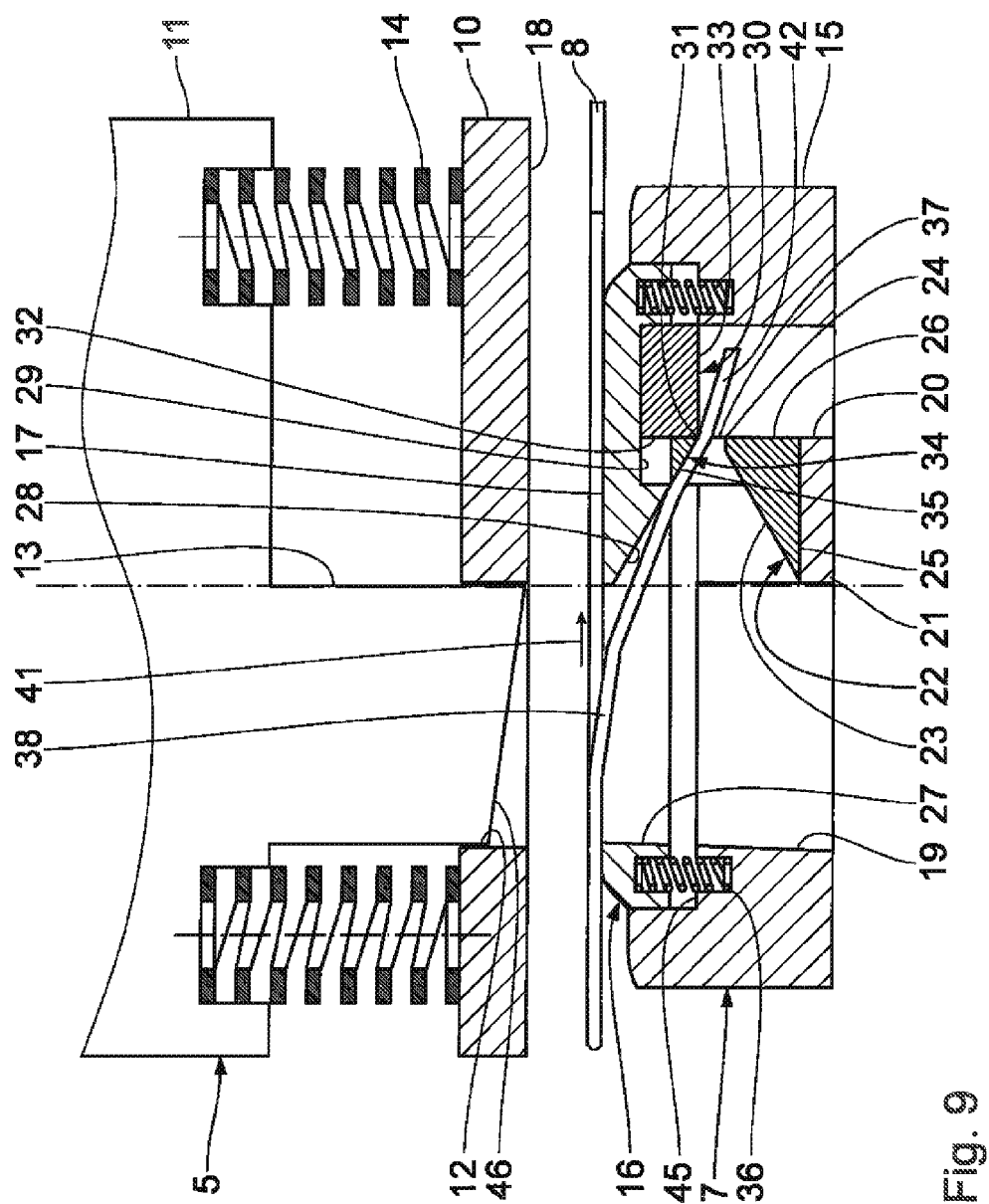
FIG. 9 shows a schematic sectional view of the punching tool, in which the workpiece is shown moved further in the direction of the cutting to length mechanism.

In FIG. 9, the punching tool is in its rest position again. The workpiece 8 or the workpiece part 38 has been moved further in the feed direction 41, so the end piece 42 passes through the cutting to length gap 37 and projects into the second discharge opening 20. The cutting to length mechanism is in its open position.

Figure 10:
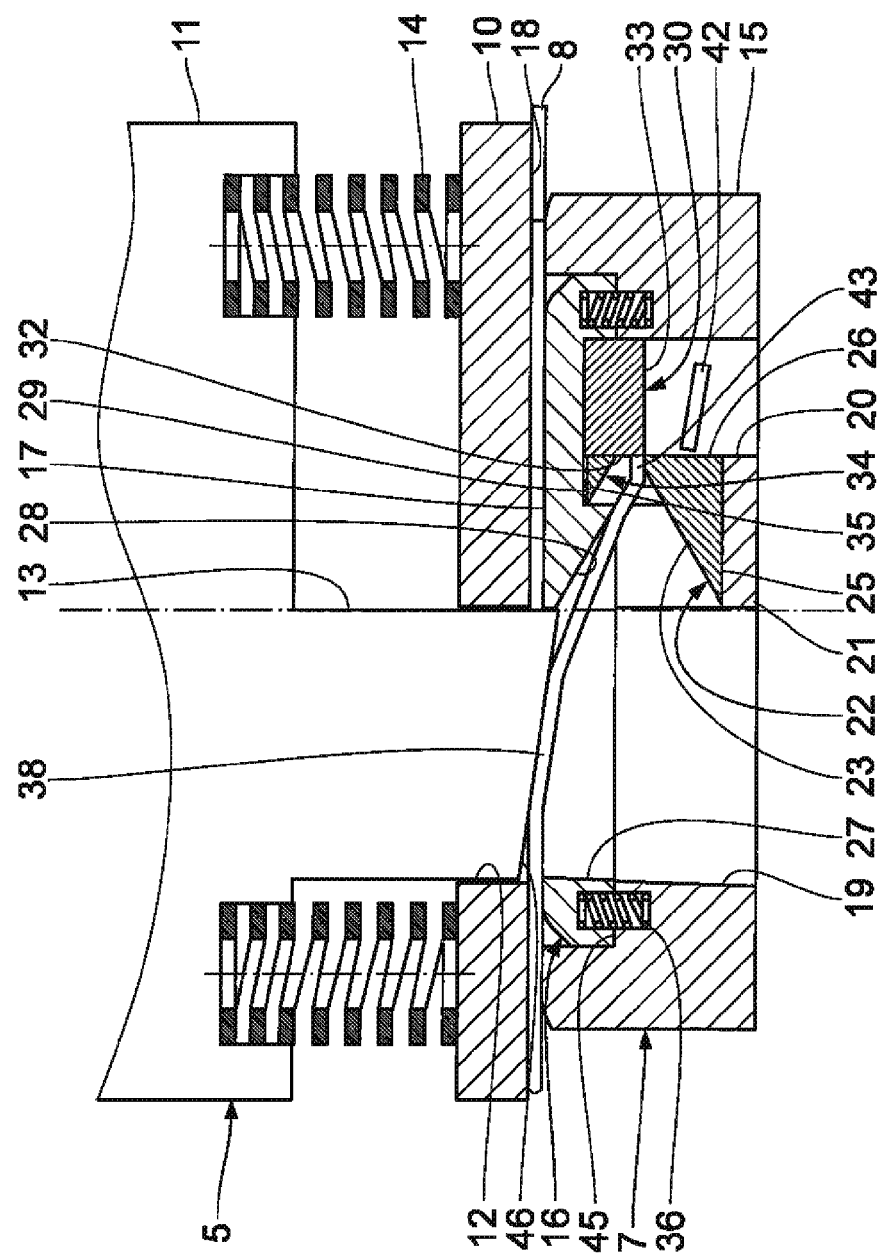
FIG. 10 shows a schematic sectional view of the punching tool, which shows a further cutting and cutting to length stroke of the punching tool.

According to FIG. 10, a further stroke takes place, by means of which the end piece 42 has been cut by the cutting to length mechanism and the workpiece part 38 has been further cut free. The stroke substantially corresponds to the first cutting stroke. The cutting to length mechanism is located in its cutting to length position. The workpiece part 38 now has a new end piece 43. The free end piece 42 is discharged by way of the second discharge opening 20.

Figure 11:
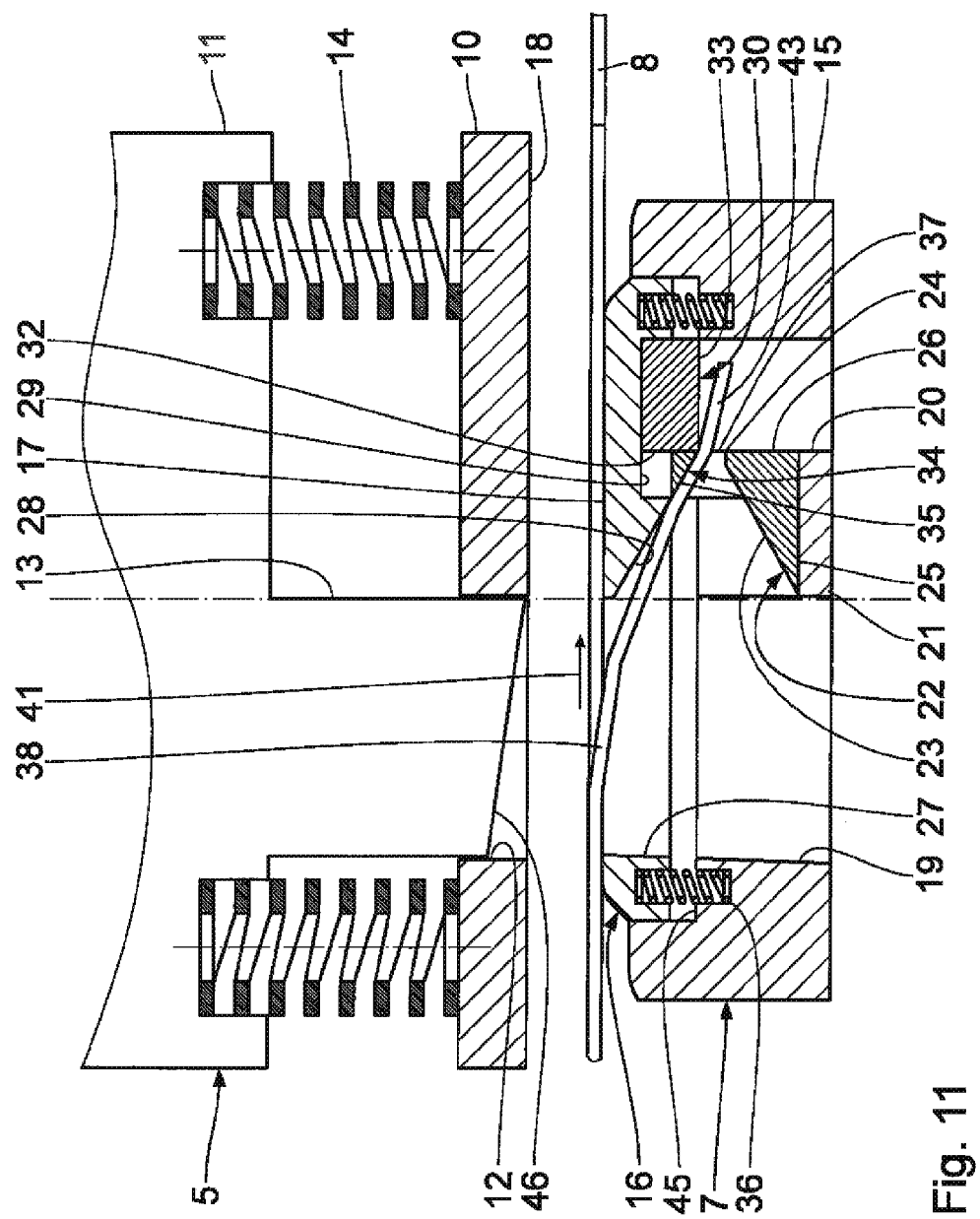
FIG. 11 shows a schematic sectional view of the punching tool, in which the workpiece is shown moved further in the direction of the cutting to length mechanism.

According to FIG. 11, the punch 5 is in its rest position again. The workpiece 8 or the workpiece part 38 has been further displaced in the feed direction 41. The end piece 43 passes through the cutting to length gap 37 and projects into the second discharge opening 20. The cutting to length mechanism is in its open position.

Figure 12:
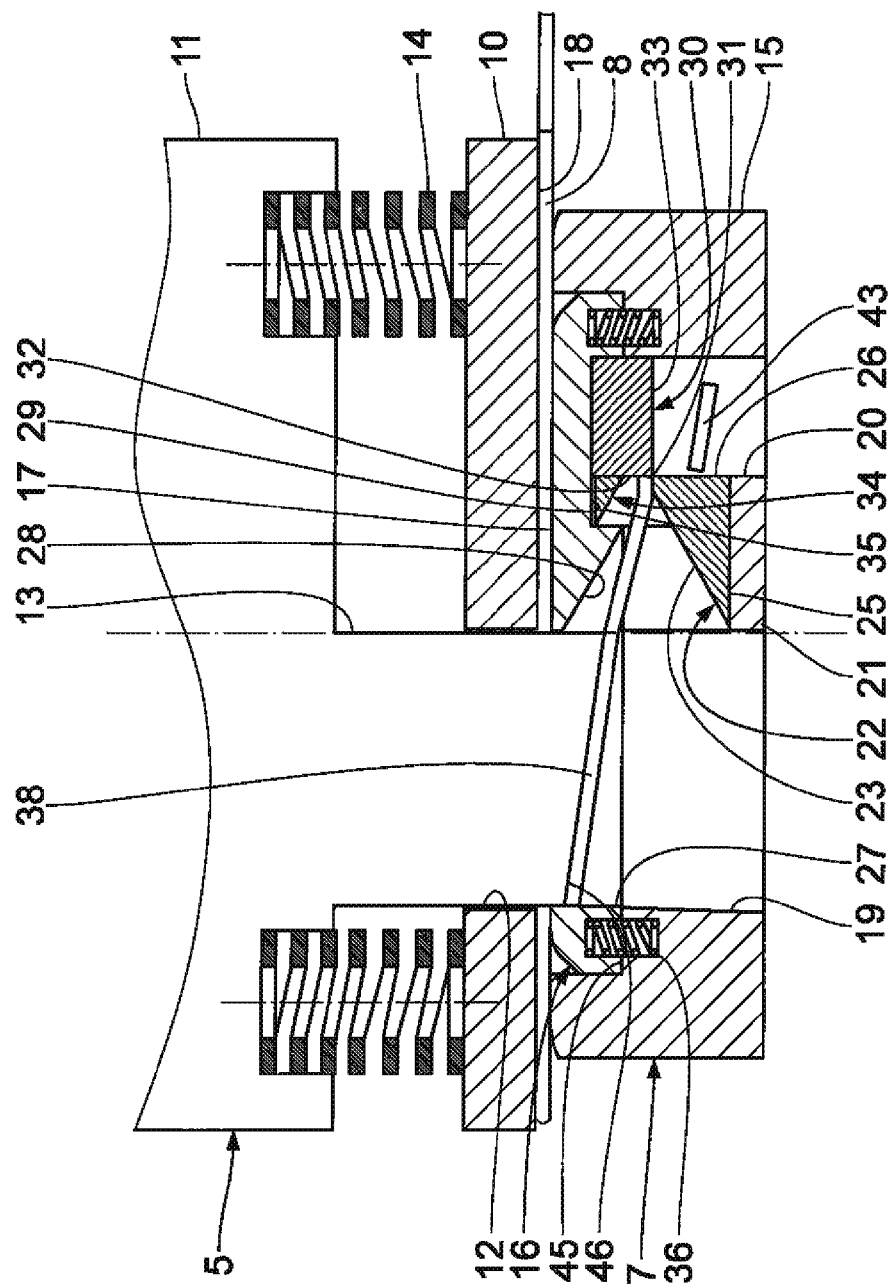
FIG. 12 shows a schematic sectional view of the punching tool, which shows an end cutting stroke of the punching tool.

According to FIG. 12, the punch 5 has carried out a deep cutting stroke, which is similar to the "normal" cutting strokes. In contrast to the previously described cutting strokes, the punch 5 completely passes through the workpiece 8, however.

On the one hand, the end piece 43 is severed by the cutting to length mechanism. On the other hand, the now completely free workpiece part 38 is completely severed by the punch mandrel 13 from the remaining workpiece 8. The connection is thus also released.

Figure 13:
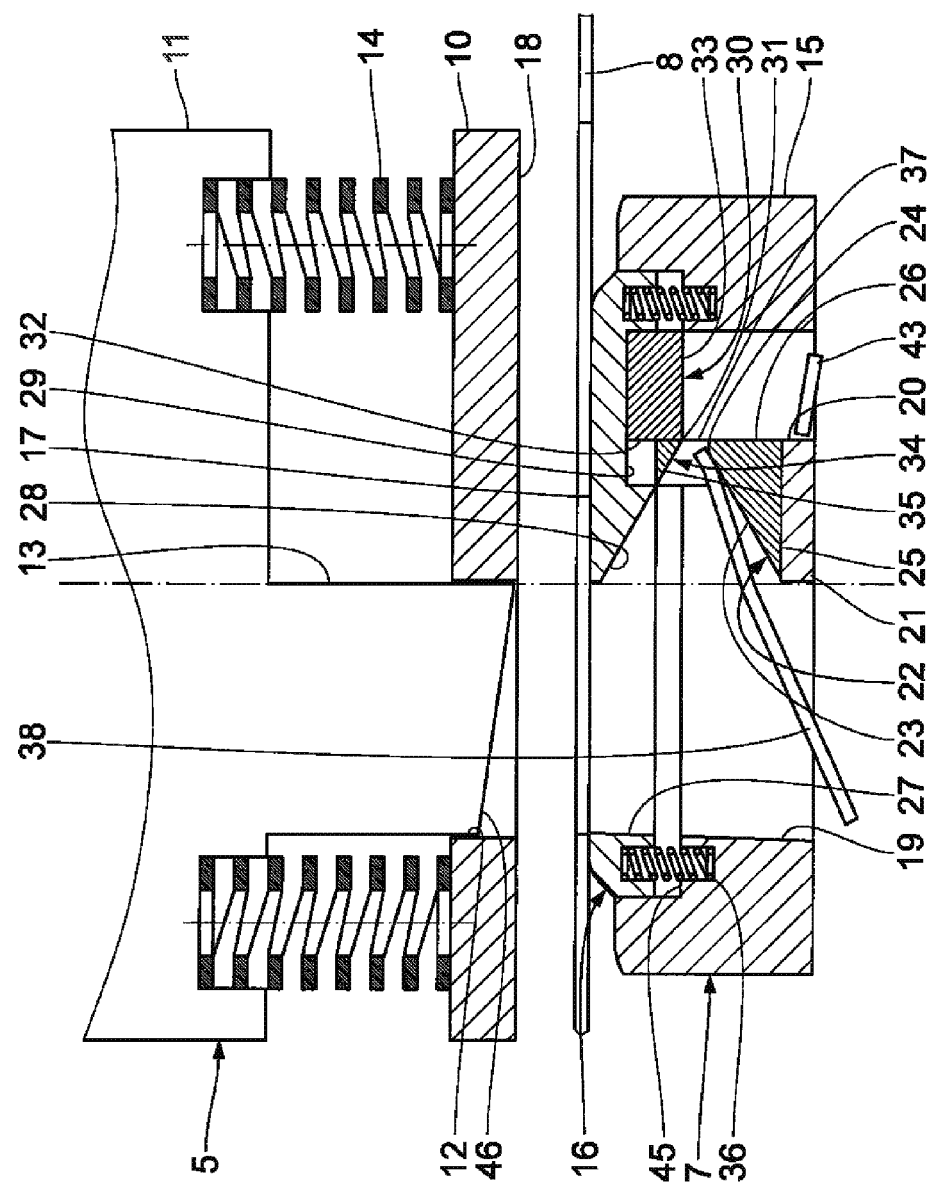
FIG. 13 shows a schematic sectional view of the punching tool, which shows a discharge of the free workpiece part and a free end piece of the workpiece part.

FIG. 13 shows the discharge of the free end piece 43 by way of the second discharge opening 20 and the discharge of the free workpiece part 38 by way of the first discharge opening 19. The free workpiece part 38 can slide along the discharge bevel 23 at the beginning. The punch 5 is again located in its rest position.

The details "upstream" and "downstream" relate to the movement direction of the workpiece part 38 in the direction of the cutting to length mechanism.

The oblique course of the discharge bevel 23, the guide bevel 28 and the introduction ramp 25 relate to the feed direction 41.

Figure 14:
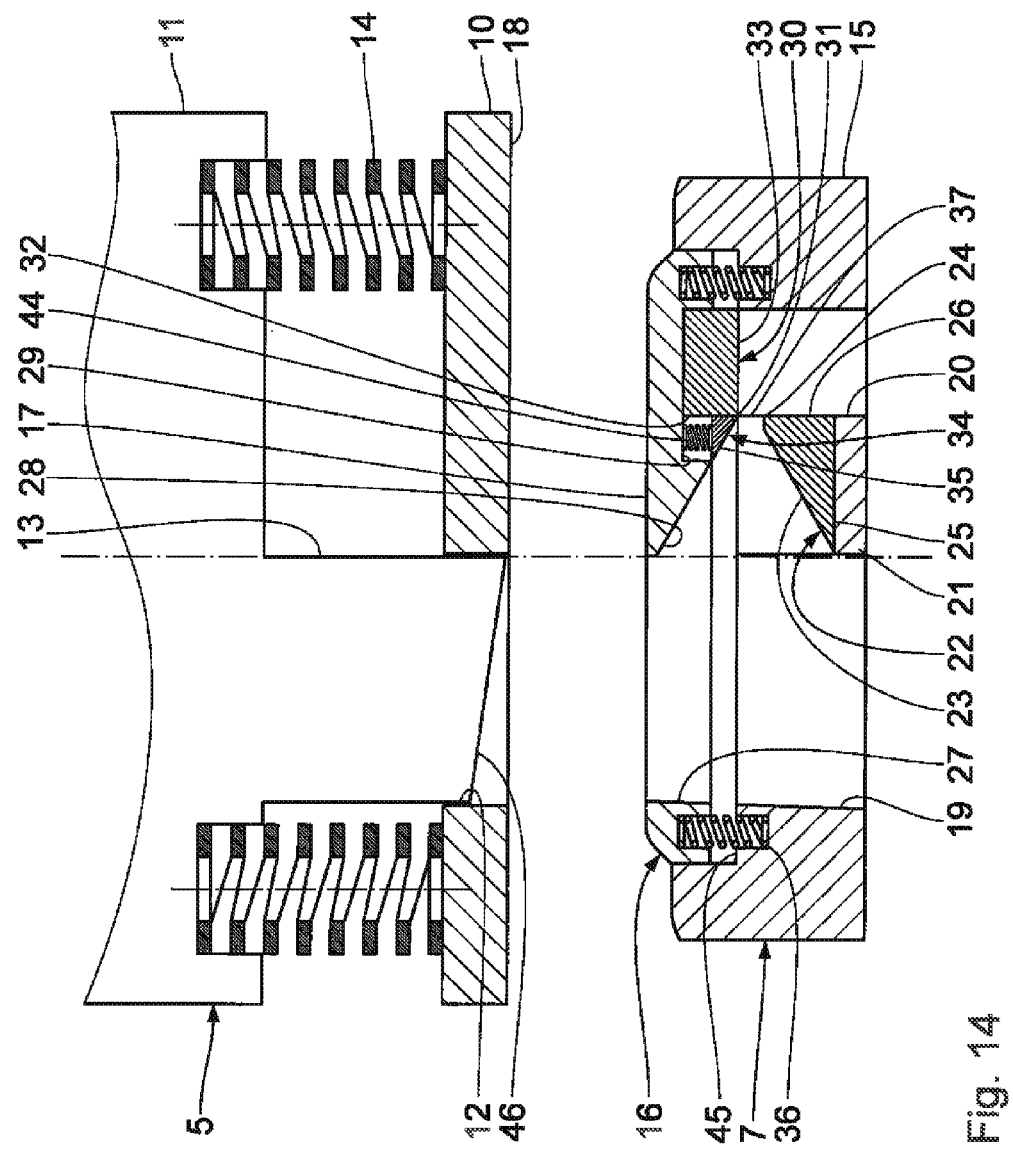
FIG. 14 shows a sectional view corresponding to FIG. 2 of a punching tool according to the invention in accordance with a second preferred embodiment of the invention.

A further embodiment of the invention will be described below with reference to FIG. 14.

In contrast to the previous embodiment, to which reference is hereby made, the introduction element 34 is spring-loaded. A helical compression spring 44, which presses the introduction element 34 into a position, in which the introduction ramp 35 thereof aligns with the guide bevel 28 and ends on the counter-cutting to length edge 31, engages on the lower side 29. The introduction element 34 is movable in the direction of the support face 17.

By means of the described punching tool, openings can be produced in workpieces 8, which have an extremely high edge quality. Both inner and outer contours can be produced.

What is claimed is:

1. A die for a punching device, comprising:
   a) a die base body,
   b) a workpiece support body provided on the die base body to support a workpiece to be machined,
   c) a cutting to length mechanism for producing a recess in the workpiece by cutting a workpiece part to length, which is fixedly connected to the remaining workpiece by means of a connection end piece during the cutting to length and is bent from the remaining workpiece for the cutting to length into the die, wherein the cutting to length mechanism comprises:
      i) a cutting to length element, and
      ii) a counter-cutting to length element for the cutting to length interaction with the cutting to length element by a plurality of cutting to length strokes, wherein the cutting to length element and the counter-cutting to length element is displaceable relative to one another between
         a cutting to length position, in which the cutting to length element and the counter-cutting to length element interact with one another so as to cut to length, and
         an open position, in which the cutting to length element and the counter-cutting to length element are spaced apart from one another, and
   d) a guide mechanism for guiding the workpiece part, and wherein the cutting to length element is arranged on the die base body, the counter-cutting to length element is arranged on the workpiece support body, and the workpiece support body is movable relative to the die base body along a cutting to length stroke axis of the die.

2. The die according to claim 1, wherein at least one spring element, which moves the cutting to length mechanism into its open position, is arranged between the workpiece support body and the die base body.

3. The die according to claim 1, wherein a through-opening for the workpiece part is formed in the workpiece support body.

4. The die according to claim 3, wherein the die base body has a first discharge opening aligning with the through-opening to discharge the free workpiece part.

5. The die according to claim 3, wherein the guide mechanism has a guide bevel on the workpiece support body, the guide bevel being provided upstream with respect to the cutting to length mechanism and adjoining the through-opening.

6. The die according to claim 1, wherein the guide mechanism has a discharge bevel fixedly connected to the die base body and the cutting to length element has a cutting to length edge, the discharge bevel being provided upstream with respect to the cutting to length edge.

7. The die according to claim 1, wherein the guide mechanism has an introduction element, which is provided on the workpiece support body, with an introduction ramp and the counter-cutting to length element has a counter-cutting to length edge, the introduction ramp being provided upstream with respect to the counter-cutting to length edge.

8. The die according to claim 7, wherein at least one spring element acts on the introduction element and moves the latter in the direction of the cutting to length element.

9. The die according to claim 1, wherein a second discharge opening for discharging cut to length, free end pieces of the workpiece part is provided in the die base body, the second discharge opening adjoining the cutting to length mechanism downstream.

10. A die for a punching device, comprising:
   a) a die base body,
   b) a workpiece support body configured support a workpiece to be machined,
   c) a cutting to length mechanism for performing a cutting to length operation on the workpiece, the cutting to length mechanism comprising:
      1) a cutting to length element mounted to one of the die base body and the workpiece support body,
      2) a counter-cutting to length element mounted to the other one of the die base body and the workpiece support body, and
      wherein the cutting to length element and counter-cutting to length element are displaceable relative to one another during a cutting to length stroke between:
         i) a cutting to length position where the cutting to length element and the counter-cutting to length element are movable relative to one another to cut the workpiece during a cutting to length stroke, and
         ii) an open position disposed from the cutting to length position where the cutting to length element and the counter-cutting to length element are spaced apart from one another so as to permit movement of the workpiece therebetween following a cutting to length stroke, and
   d) at least one biasing element disposed in operable cooperation with the die base body and the workpiece support body, the at least one biasing element urging one of the cutting to length element and counter-cutting to length element toward the open position, and
   e) a workpiece guide mechanism having a guide surface that guides a portion of the workpiece between the cutting to length element and the counter-cutting to length element when disposed in the open position.

11. The die according to claim 10, wherein a plurality of the cutting to length strokes are performed during the cutting to length operation.

12. The die according to claim 10, wherein the at least one biasing element comprises one of a helical spring, a plate spring and a block of resilient material.

13. The die according to claim 10, wherein the workpiece guide mechanism is disposed upstream of the cutting to length position, the workpiece guide mechanism having a guide surface comprising a bevel that guides the workpiece between the cutting to length element and the counter-cutting to length element when the cutting to length mechanism is disposed in the open position.

14. The die according to claim 10, wherein the cutting to length mechanism is configured such that one of the cutting to length element and the counter-cutting to length element move relative to one another toward the other one of the cutting to length element and the counter-cutting to length element until engaging and cutting off a workpiece part from the workpiece during a cutting to length stroke.

15. The die according to claim 14, wherein the die base body has i) a cut to length piece discharge opening disposed on one side of the cutting to length position of the cutting to length mechanism through which the workpiece part passes during performing of a cutting to length operation, and ii) a workpiece discharge opening disposed on an opposite side of the cutting to length position of the cutting to length mechanism through which the workpiece passes when finished.

16. The die according to claim 10, wherein the die base body has i) a cut to length piece discharge opening disposed on one side of the cutting to length position of the cutting to length mechanism through which a cut to length piece of the workpiece passes during performing of a cutting to length operation on the workpiece, and ii) a workpiece discharge opening disposed on an opposite side of the cutting to length position of the cutting to length mechanism through which the workpiece passes after the cutting to length operation is finished.

17. The die according to claim 16, wherein the workpiece support body has a die punch receiving through-opening disposed in alignment with the cut to length piece discharge opening in the die base body.

18. The die according to claim 17, wherein the cut to length piece discharge opening is disposed downstream of the cutting to length position of the cutting to length mechanism, and wherein the workpiece discharge opening is disposed upstream of the cutting to length position of the cutting to length mechanism.

19. The die according to claim 16, wherein the at least one biasing element comprises at least one spring, and wherein a plurality of cutting to length strokes are performed during the cutting to length operation to produce the cut to length piece of the workpiece.

* * * * *